United States Patent
Pickett et al.

(10) Patent No.: US 8,542,071 B2
(45) Date of Patent: Sep. 24, 2013

(54) CHAOTIC OSCILLATOR-BASED RANDOM NUMBER GENERATION

(75) Inventors: Matthew D Pickett, San Francisco, CA (US); Gilberto Medeiros Ribeiro, Palo Alto, CA (US); R Stanley Williams, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/280,808

(22) Filed: Oct. 25, 2011

(65) Prior Publication Data

US 2013/0099872 A1      Apr. 25, 2013

(51) Int. Cl.
*H03B 29/00* (2006.01)
(52) U.S. Cl.
USPC ............. 331/78; 331/111; 331/115; 375/377; 375/259; 375/227
(58) Field of Classification Search
USPC ................... 331/111, 78, 115; 375/377, 259, 375/227
See application file for complete search history.

(56) References Cited

U.S. PATENT DOCUMENTS

| | | | |
|---|---|---|---|
| 6,212,239 B1 * | 4/2001 | Hayes | 375/259 |
| 6,732,127 B2 | 5/2004 | Karp | |
| 7,779,060 B2 | 8/2010 | Kocarev et al. | |
| 7,930,333 B2 | 4/2011 | Vartsky et al. | |
| 2010/0005128 A1 | 1/2010 | Ergun | |
| 2011/0015790 A1 | 1/2011 | Yamakawa et al. | |
| 2011/0123022 A1 | 5/2011 | Oishi et al. | |

FOREIGN PATENT DOCUMENTS

RU      2168844 C1      6/2001

* cited by examiner

*Primary Examiner* — Arnold Kinkead
(74) *Attorney, Agent, or Firm* — Robert M. Brush

(57) ABSTRACT

Chaotic oscillator-based random number generation is described. In an example, a circuit includes a negative differential resistance (NDR) device to receive an alternating current (AC) bias. The circuit further includes a capacitance in parallel with the NDR device, the capacitance having a value such that, in response to a direct current (DC) bias applied to the NDR device and the capacitance, a voltage across the capacitance oscillates with a chaotic period. The circuit further includes a random number generator to generate random numbers using samples of the voltage across the capacitance.

15 Claims, 4 Drawing Sheets

CHAOTIC OSCILLATOR-BASED RANDOM NUMBER GENERATION

BACKGROUND

Random number generators are useful for a large number of applications, such as in computing systems. Some random number generators are software-based. Software-based random number generators depend on the randomness of user input, such as keyboard strokes and mouse movement, to generate random numbers. However, this so-called "user entropy" can sometimes be unavailable for seeding random numbers in some applications, such as with virtual machines running on a computer system. As such, the randomness of the numbers generated by a software-based solution can be insufficient for various applications. Some random number generators are hardware-based, and can generate "pseudo-random" numbers. A hardware-based generator can generate a sequence of numbers that approximate the properties of random numbers. The sequence is not truly random, as it is completely determined by a small set of initial values or "seed values." In some applications, truly random numbers are preferred to pseudorandom numbers.

BRIEF DESCRIPTION OF THE DRAWINGS

Some embodiments of the invention are described with respect to the following figures.

DETAILED DESCRIPTION

Figure 1:
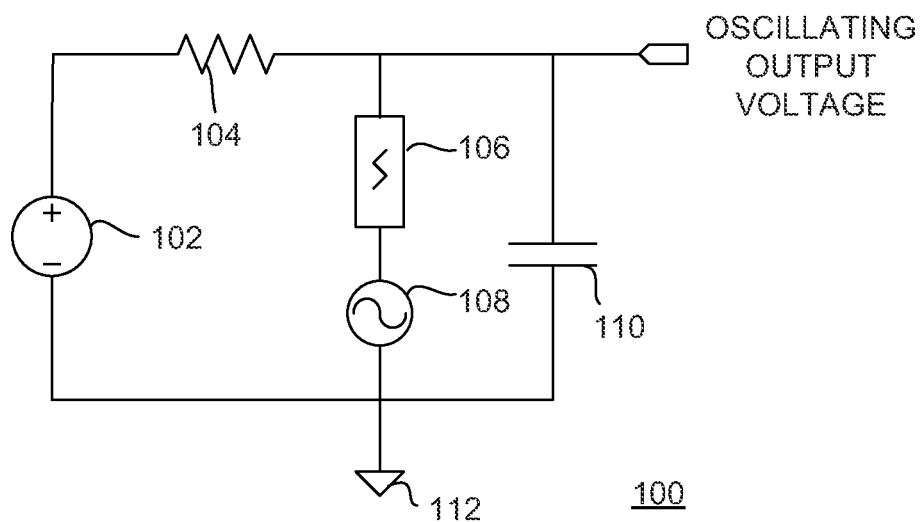
FIG. 1 is a schematic diagram showing a chaotic oscillator circuit according to an example implementation.

FIG. 1 is a schematic diagram showing a chaotic oscillator circuit 100 according to an example implementation. The chaotic oscillator circuit 100 can include a bias voltage supply 102, a resistance 104, a negative differential resistance (NDR) device 106, a bias voltage supply 108, and a capacitance 110. Element 112 identifies electrical ground or other common potential. The NDR device 106 is in series with the bias voltage supply 108. The NDR device 106 and the bias voltage supply 108 are in parallel with the capacitance 110. The NDR device 106 and the capacitance 110 are in series with the resistance 104. In an example, the bias voltage supply 102 supplies a direct current (DC) bias voltage, and the bias voltage supply 108 supplies an alternating current (AC) bias voltage. In an example, the magnitude of the AC bias voltage is less than the DC bias voltage. The frequency of the AC bias voltage can be selected based on the values of the properties of the resistance 104, capacitance 110, and NDR device 106, The resistance 104 can be provided by any type of resistive component, such as a resistor or other type of semiconductor formation resulting in resistance. The capacitance 110 can be provided by any type of capacitive component, such as a capacitor or other type of semiconductor formation resulting in capacitance.

In an example, the NDR device 106 is a current-controlled NDR device. For example, the NDR device 106 can be a metal-oxide-metal device that functions as a threshold switch. In another example, the NDR device 106 can be an amorphous silicon device. The following describes the manner in which an oscillating signal is produced with a chaotic oscillation period.

When a DC bias voltage is applied by the bias voltage supply 102, the DC bias voltage will be divided between the resistance 104 and the NDR device 106. The same voltage applied across the NDR device 106 will be coupled across the capacitance 110. The voltage across the capacitance 110 will begin increasing. The capacitance 110 will charge according to a time constant defined by the capacitance 110 and the resistance 104. After the capacitance 110 charges to a particular voltage level, the current flowing through the NDR device 106 will cause the voltage across the NDR device 106 to fall within an "NDR region" (described below with respect to FIG. 2), which essentially causes the NDR device 106 to provide a negative resistance. A device that exhibits a "negative resistance" will experience a decrease in voltage with a rise in current at certain current levels. This is opposed to standard electric devices that always experience an increase in voltage with an increase in current. Due to the negative resistance, the NDR device 106 will experience a decrease in voltage with the rising current. This will cause the capacitance 110 to begin to discharge.

Figure 2:
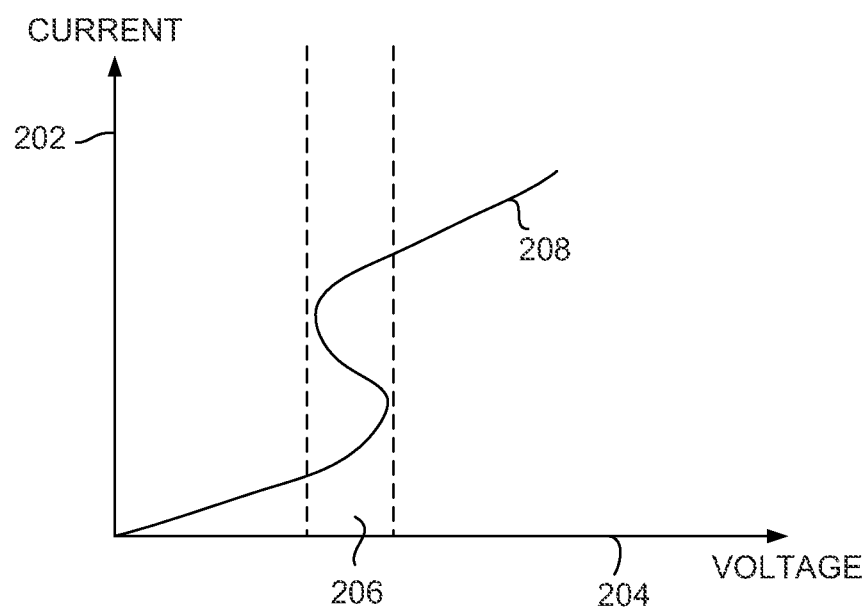
FIG. 2 shows a graph relating current through a negative differential resistance (NDR) device to voltage across the NDR device according to an example implementation.

FIG. 2 shows a graph 200 relating current through the NDR device 106 to voltage across the NDR device 106 according to an example implementation. The graph 200 includes an axis 202 representing current, and an axis 204 representing voltage. A curve 208 represents the voltage-current relationship for the NDR device 106. As voltage across the NDR device 106 increases, current begins to flow through the NDR device 106. When the current reaches a certain value, the voltage across the NDR device 106 begins decreasing. There exists a region 206 (NDR region) where the voltage decreases with increasing current. As the current is still further increased, the voltage will again begin to increase, eventually outside of the region 206.

Returning to FIG. 1, the voltage across the NDR device 106 oscillates according to the AC bias voltage of the source 108, but generally increases as the capacitance 110 is charged by the DC bias of the source 102. Once current through the NDR device 106 triggers negative resistance, the voltage across the NDR device 106 generally decreases. After the capacitance 110 has discharged below a certain level, the current flowing through the NDR device 106 will fall outside of the NDR region. Thus, the voltage across the NDR device 106 will once again increase with increasing current. This will cause the capacitance 110 to begin charging again. The continual charging and discharging of the capacitance 110 causes an oscillating voltage signal across the capacitance 110 ("oscillating output voltage").

Figure 3A:
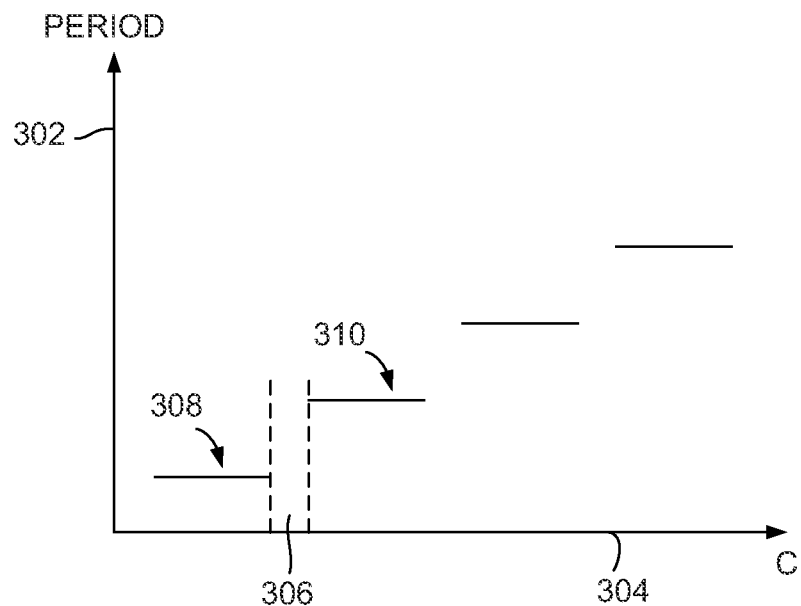
FIGS. 3A and 3B show graphs of oscillating period versus capacitance according to example implementations.

The value of the capacitance 110 controls the period of the oscillating output voltage. FIG. 3A shows a graph 300 of oscillating period versus capacitance according to an example implementation. The graph 300 includes an axis 302 representing the period of oscillation, and an axis 304 representing capacitance. The period of oscillation increases in a step-pattern as the capacitance increases. In an example, the period doubles after each step. That is, the period is constant and stable for a certain range of capacitance, and then increases (e.g., doubles) and remains constant and stable for another range of capacitance. For example, a stable oscillating period 308 exists for a certain range of capacitance, followed by an increased stable oscillating period 310 for another range of capacitance. A region 306 ("transition region") of capacitance between the ranges marks a transition between stable period 308 and stable period 310. The period becomes unstable at a certain range of capacitance in the transition region 306.

Figure 3B:
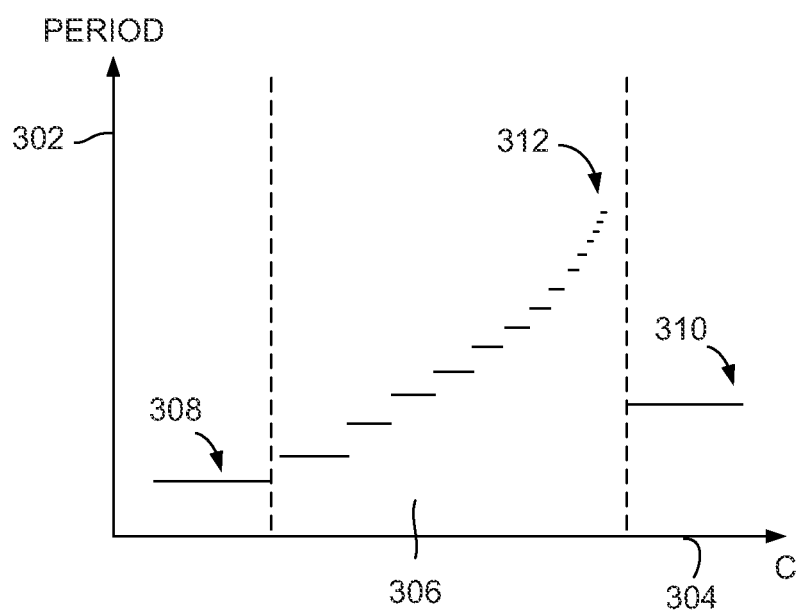

Notably, FIG. 3B shows a graph 301 of oscillating period versus capacitance in the transition region 306 according to an example implementation. Initially, the capacitance results in the stable period 308. As the capacitance increases, the period begins increasing (e.g., doubling). The increasing periods, however, exist for narrower and narrower ranges of capacitance. Eventually the capacitance is increased to a point resulting in the stable period 310. Thus, a region 312 of capacitance exists where the period increases rapidly between two stable periods. The behavior of the period in the capacitance region 312 is unstable and chaotic in the presence of noise. Within the capacitance region 312, there is a period multiplication route to chaos. By "chaos", it is meant that the period is highly sensitive to slight changes in conditions such that small alterations in the conditions (e.g., noise) can give rise to large changes in the period.

Returning to FIG. 1, the capacitance 110 can be a component, such as a capacitor, designed to have a specific capacitance ("target capacitance") such that the period of the oscillating output voltage is unstable and chaotic in the presence of noise in the circuit 100, as shown in FIG. 3B. Thus, the circuit 100 can be designed to provide an oscillating output voltage having an unstable and chaotic period of oscillation. Such an oscillating output voltage with chaotic period can be used for random number generation, as discussed below.

The circuit 100 generally provides a relaxation oscillator that is driven by an NDR device having an AC bias. The capacitance in the relaxation oscillator is tuned to an edge of stability such that the oscillation period of the output voltage experiences a multiplication route to chaos. Thus, the output voltage will oscillate with an unstable and chaotic period in the presence of noise.

Figure 4:
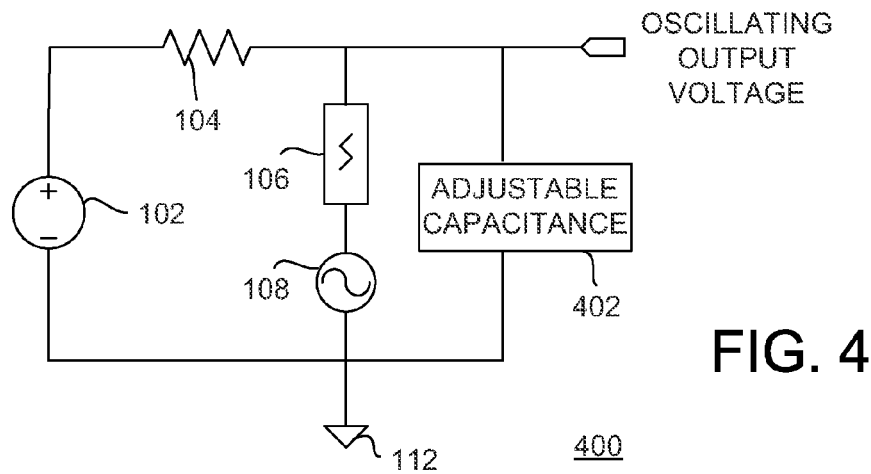
FIG. 4 is a schematic diagram showing another chaotic oscillator circuit according to an example implementation.

FIG. 4 a schematic diagram showing another chaotic oscillator circuit 400 according to an example implementation. Elements of FIG. 4 that are the same or similar to FIG. 1 are designated with identical reference numerals and described in detail above. In the present example, the capacitance 110 can be replaced with an adjustable capacitance 402. In an example, the adjustable capacitance 402 can be a voltage-controlled capacitance, such as a varactor or the like. Thus, the adjustable capacitance 402 can be tuned dynamically during operation to an edge of stability such that the oscillation period of the output voltage experiences a multiplication route to chaos.

Figure 5:
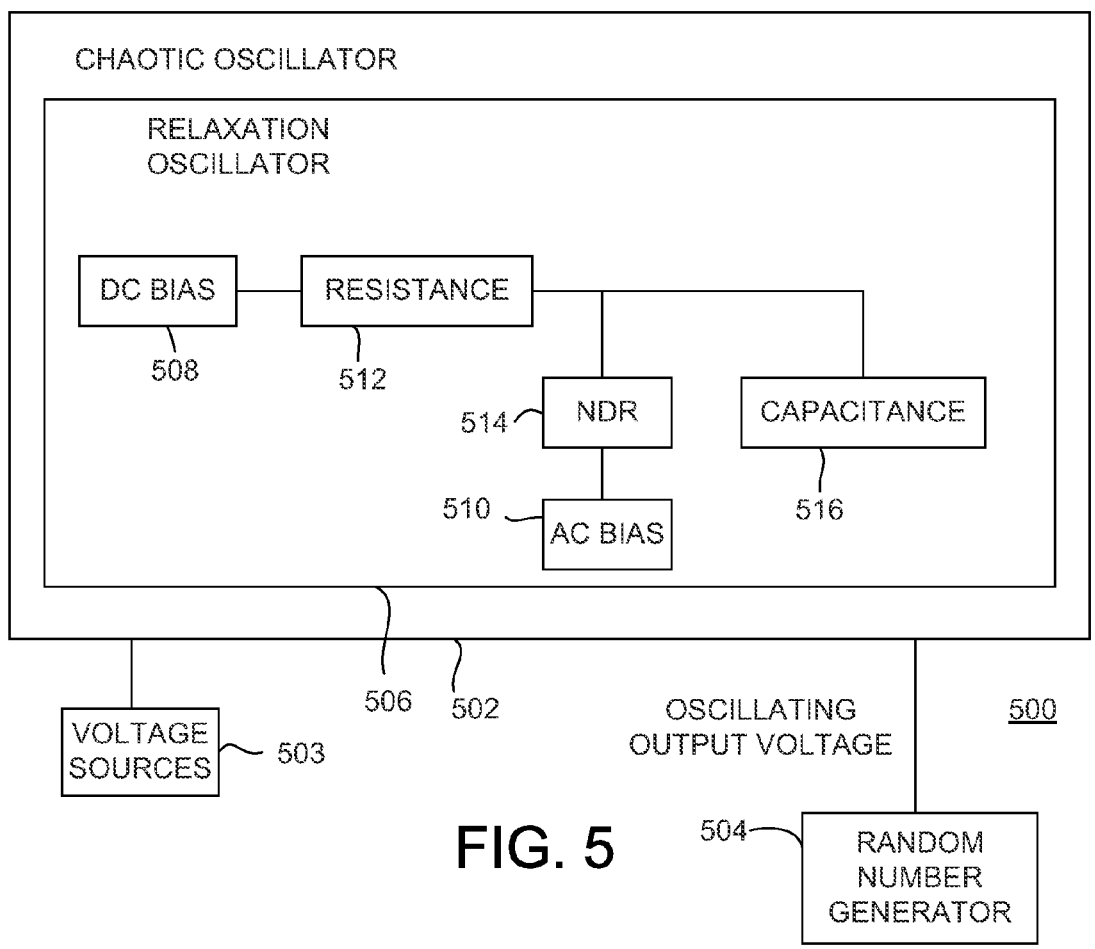
FIG. 5 is a block diagram showing a circuit to generate random numbers according to an example implementation.

FIG. 5 is a block diagram showing a circuit 500 to generate random numbers according to an example implementation. The circuit 500 includes a chaotic oscillator 502, voltage sources 503, and a random number generator 504. The chaotic oscillator 502 receives bias voltage from the voltage source 503, and produces an oscillating output voltage with chaotic oscillation period. The random number generator 504 samples the oscillating output voltage to generate voltage samples, and uses the voltage samples as seed values to generate random numbers. The chaotic oscillator 502 includes a relaxation oscillator 506 having a DC bias input 508, an AC bias input 510, a resistance 512, an NDR device 514, and a capacitance 516. In an example, the relaxation oscillator 506 can be arranged as shown by the circuit 100 of FIG. 1 or the circuit 400 of FIG. 4. The capacitance 516 can be tuned to result in an unstable and chaotic oscillation period, as described above. The random number generator 504 can include various analog and digital circuits to sample the oscillating output voltage and digital representations of random numbers based on initial "seed values."

The circuit 500 provides a hardware-based random number generator that can be used to generate random numbers for various applications, such as for use in computing devices and systems by various software applications, operating systems, hardware peripherals, and the like. The input entropy (e.g., seed values) is chaotic resulting in true random numbers, in contrast to pseudo-random numbers generated by other types of circuits, such as shift-register based circuits.

Figure 6:
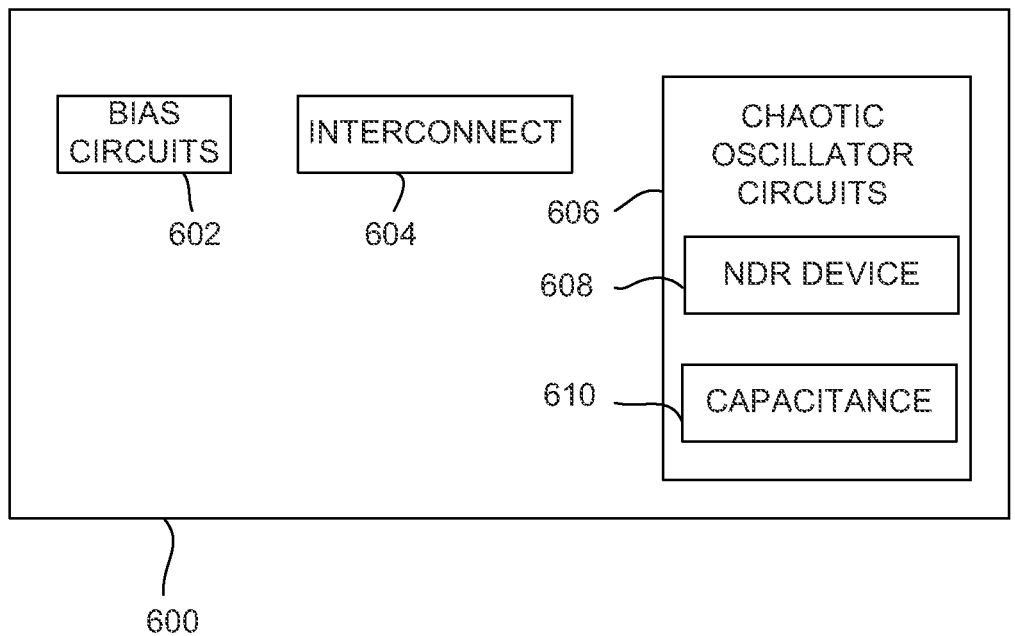
FIG. 6 illustrates a semiconductor device according to an example implementation.

FIG. 6 illustrates a semiconductor device 600 according to an example implementation. The semiconductor device 600 includes bias circuits 602, conductive interconnect 604, and chaotic oscillator circuits 606. The chaotic oscillator circuits 606 can include an NDR device 608 and a capacitance 610. The chaotic oscillator circuits 606 can receive bias voltages from the bias circuits 602 through the conductive interconnect 604. The capacitance 610 can be formed on the semiconductor device 600 using any of various capacitive formations, capacitors, or adjustable capacitances. The NDR device 608 can include a metal-oxide-metal device.

Figure 7:
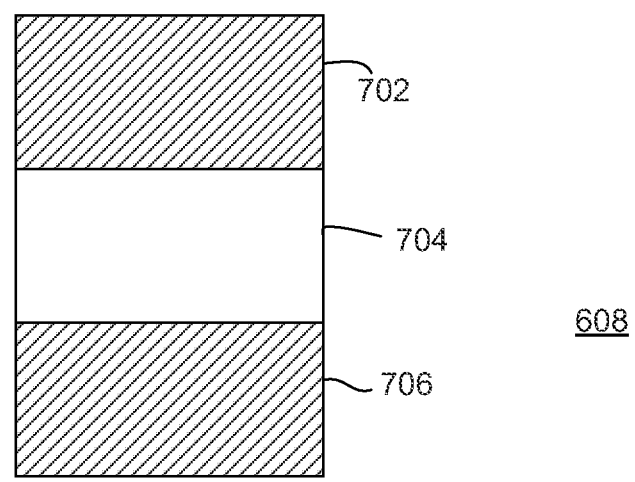
FIG. 7 shows a cross-section of an NDR device according to an example implementation.

FIG. 7 shows a cross-section of the NDR device 608 according to an example implementation. The NDR device 608 includes an electrode 702, an electrode 706, and an oxide 704 between the electrodes 702 and 706. The oxide 704 can be made from various materials, including vanadium oxide materials, iron oxide materials, niobium oxide materials, titanium oxide materials, manganese oxide materials, and the like. The electrodes 702 and 706 can be mode from various conductive materials, such as copper, gold, aluminum, and the like. The metal-oxide-metal structure of the NDR device 608 can exhibit negative resistance with the application of a current to the metal-oxide-metal device. Negative resistance occurs when electric current is injected between the electrodes 702 and 706, which locally heats the oxide 704 above a transition temperature. The transition temperature is the temperature at which a solid material changes from one crystal state to another. This rise above the transition temperature causes current filamentation to occur. Current filamentation is an inhomogeneity in the current density distribution orthogonal to the direction of current flow. This current filamentation is what causes the negative resistance at certain current levels.

Returning to FIG. 6, the bias circuits 602, the conductive interconnect 604, and the chaotic oscillator circuits 606 can be connected and formed on the semiconductor device 600 to operate according to the circuit 100 shown in FIG. 1. The semiconductor device 600 can also include logic 608 forming a random number generator circuit. The bias circuits 602, the conductive interconnect 604, the chaotic oscillator circuits 606, and the logic 608 can be connected and formed on the semiconductor device 600 to operate according to the circuit 500 shown in FIG. 5.

The chaotic oscillator 606 can be fabricated using a complementary metal oxide semiconductor (CMOS) compatible process. Accordingly, the chaotic oscillator can be used to seed a random number generate at a microprocessor level (e.g., the chaotic oscillator can be formed on an integrated circuit along with the random number generator). The chaotic oscillator 606 can be relatively small in size compared to other types of hardware-based solutions and requires less power. In an example, the chaotic oscillator 606 includes conductive interconnect, a metal-oxide-metal device, and a capacitor. Classical CMOS circuits for producing random numbers can be large and require a substantial amount of feedback, which limits the speed and increases power consumption. Classical optical and quantum based circuits are incompatible with standard CMOS processes, and require their own separate packages and overhead.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A circuit, comprising:
   a negative differential resistance (NDR) device to receive an alternating current (AC) bias;
   a capacitance in parallel with the NDR device, the capacitance having a value such that, in response to a direct current (DC) bias applied to the NDR device and the capacitance, a voltage across the capacitance oscillates with a chaotic period; and
   a random number generator to generate random numbers using samples of the voltage across the capacitance;
   wherein the circuit is formed on a semiconductor device, and wherein the NDR device comprises a metal-oxide-metal device formed on the semiconductor device.

2. The circuit of claim 1, further comprising:
   a resistance in series with the NDR device and the capacitance.

3. The circuit of claim 1, wherein, in response to the DC bias and noise, the capacitance repeatedly charges when the NDR device exhibits a high resistance state, and discharges when NDR device exhibits a low resistance state, to produce oscillations in the voltage across the capacitance having the chaotic period.

4. The circuit of claim 1, wherein the capacitance is a capacitor or an adjustable capacitor.

5. A circuit, comprising:
   a relaxation oscillator to receive a direct current (DC) input voltage as input, and having a capacitance in parallel with a negative differential resistance (NDR) component to provide an oscillating output voltage, where the NDR component receives an alternating current (AC) bias and the capacitance has a value such that the oscillating output voltage has a chaotic period; and
   a random number generator to generate random numbers using samples of the output voltage;
   wherein the relaxation oscillator is formed on a semiconductor substrate, and wherein the NDR component comprises a metal-oxide-metal device formed on the semiconductor substrate.

6. The circuit of claim 5, wherein, in response to the DC input voltage and noise, the capacitance repeatedly charges when the NDR device exhibits a high resistance state, and discharges when NDR device exhibits a low resistance state, to produce oscillations in the output voltage having the chaotic period.

7. The circuit of claim 5, wherein the capacitance comprises a capacitor or an adjustable capacitor.

8. The circuit of claim 5, wherein the parallel combination of the NDR component and the capacitance is in series with a resistance.

9. The circuit of claim 5, further comprising voltage sources for providing the DC bias and the AC bias.

10. A circuit, comprising:
    a direct current (DC) bias source;
    a resistance in series with the DC bias source;
    a negative differential resistance (NDR) device in series with the resistance;
    an alternating current (AC) bias source in series with the NDR device;
    a capacitance in parallel with the NDR device; and
    a random number generator to generate random numbers using samples of a voltage across the capacitance;
    wherein the circuit is formed on a semiconductor device, and wherein the NDR device comprises a metal-oxide-metal device formed on the semiconductor device.

11. The circuit of claim 10, wherein, in response to a DC bias from the DC bias source and noise, the capacitance repeatedly charges when the NDR device exhibits a high resistance state, and discharges when NDR device exhibits a low resistance state, to produce oscillations in the voltage across the capacitance having the chaotic period.

12. The circuit of claim 10, wherein the capacitance comprises a capacitor or an adjustable capacitor.

13. A circuit, comprising:
    a negative differential resistance (NDR) device to receive an alternating current (AC) bias;
    a capacitance in parallel with the NDR device, the capacitance having a value such that, in response to a direct current (DC) bias applied to the NDR device and the capacitance, a voltage across the capacitance oscillates with a chaotic period; and
    a random number generator to generate random numbers using samples of the voltage across the capacitance;
    wherein the capacitance is an adjustable capacitor.

14. The circuit of claim 13, further comprising:
    a resistance in series with the NDR device and the capacitance.

15. The circuit of claim 1, wherein, in response to the DC bias and noise, the capacitance repeatedly charges when the NDR device exhibits a high resistance state, and discharges when NDR device exhibits a low resistance state, to produce oscillations in the voltage across the capacitance having the chaotic period.

* * * * *